US010994160B2

United States Patent
Mou et al.

(10) Patent No.: US 10,994,160 B2
(45) Date of Patent: May 4, 2021

(54) DRIVING AND INFORMATION TRANSMITTING SYSTEM FOR AIR-FILTERING PROTECTION DEVICE

(71) Applicant: Microjet Technology Co., Ltd., Hsinchu (TW)

(72) Inventors: Hao-Jan Mou, Hsinchu (TW); Chi-Feng Huang, Hsinchu (TW); Yung-Lung Han, Hsinchu (TW); Chang-Yen Tsai, Hsinchu (TW); Wei-Ming Lee, Hsinchu (TW); Hsuan-Kai Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 441 days.

(21) Appl. No.: 16/034,704

(22) Filed: Jul. 13, 2018

(65) Prior Publication Data
US 2019/0046818 A1 Feb. 14, 2019

(30) Foreign Application Priority Data

Aug. 8, 2017 (TW) .................................. 106126719

(51) Int. Cl.
*A62B 18/08* (2006.01)
*A62B 9/00* (2006.01)
(Continued)

(52) U.S. Cl.
CPC .............. *A62B 18/08* (2013.01); *A62B 9/006* (2013.01); *A62B 23/02* (2013.01); *B01D 46/429* (2013.01)

(58) Field of Classification Search
CPC ......... A62B 18/08; A62B 9/006; A62B 23/02; A62B 17/006; A62B 18/003; A62B 23/00; A62B 23/025; B01D 46/429; A61M 19/00
See application file for complete search history.

(56) References Cited

U.S. PATENT DOCUMENTS

2007/0101990 A1* 5/2007 Hacke ............... A61M 16/1065
128/201.25
2013/0047982 A1 2/2013 Tobias et al.
(Continued)

FOREIGN PATENT DOCUMENTS

CN 103987427 A 8/2014
CN 103989478 A 8/2014
(Continued)

OTHER PUBLICATIONS

Extended European Seach Report for European Application No. 18183402.9, dated Nov. 19, 2018.
(Continued)

*Primary Examiner* — Samchuan C Yao
*Assistant Examiner* — Nathan M Le
(74) *Attorney, Agent, or Firm* — Birch, Stewart, Kolasch & Birch, LLP

(57) ABSTRACT

A driving and information transmitting system for an air-filtering protection device includes a filtering mask, an actuating and sensing device mounted on the filtering mask, a power supply device and a connection device. The actuating and sensing device includes at least one sensor, at least one actuating device, a microprocessor, a power controller and a data transceiver. The actuating device is enabled to transfer air to flow toward the sensor. The power supply device transfers an energy to the power controller for enabling the sensor and the actuating device. After monitored information is generated by the sensor and processed into an output data by the microprocessor, the data transceiver receives and transmits the output data to the connection device. After a control command is given by the connection device, the data transceiver receives and transmits the control command to the microprocessor to control the sensor and enable the actuating device.

21 Claims, 13 Drawing Sheets

(51) Int. Cl.
*A62B 23/02* (2006.01)
*B01D 46/42* (2006.01)

(56) References Cited

U.S. PATENT DOCUMENTS

| | | | |
|---|---|---|---|
| 2013/0104900 A1* | 5/2013 | Tobias | A61M 16/105 |
| | | | 128/205.12 |
| 2013/0146052 A1* | 6/2013 | Ding | A62B 18/088 |
| | | | 128/202.22 |
| 2013/0298775 A1* | 11/2013 | Fiet | A62B 19/00 |
| | | | 96/147 |
| 2014/0311490 A1 | 10/2014 | Volmer et al. | |
| 2015/0020800 A1 | 1/2015 | Tobias | |
| 2016/0076530 A1* | 3/2016 | Chen | F04B 43/046 |
| | | | 417/413.2 |
| 2016/0297025 A1* | 10/2016 | Enyedy | B23K 9/173 |
| 2017/0001048 A1 | 1/2017 | Volmer et al. | |
| 2017/0028228 A1* | 2/2017 | Zhao | A62B 18/084 |
| 2017/0086504 A1 | 3/2017 | Cameron | |
| 2017/0222121 A1 | 8/2017 | Chen et al. | |
| 2018/0104517 A1* | 4/2018 | Schuller | A62B 9/02 |
| 2019/0009114 A1* | 1/2019 | Han | A41D 1/002 |
| 2019/0275359 A1* | 9/2019 | Shen | A62B 18/08 |
| 2020/0215364 A1* | 7/2020 | Webb | G01M 3/04 |

FOREIGN PATENT DOCUMENTS

| | | |
|---|---|---|
| CN | 105058424 A | 11/2015 |
| CN | 205287298 U | 6/2016 |
| CN | 205538890 U | 8/2016 |
| CN | 205598453 U | 9/2016 |
| CN | 106730464 A | 5/2017 |
| KR | 10-2017-0076833 A | 7/2017 |
| TW | M525446 U | 7/2016 |
| TW | M540932 U | 5/2017 |
| WO | WO 2008/145988 A1 | 12/2008 |
| WO | WO 2012/044430 A2 | 4/2012 |
| WO | WO 2015/175777 A1 | 11/2015 |

OTHER PUBLICATIONS

Chinese Office Action and Search Report for Chinese Application No. 201710670895.3, dated Mar. 17, 2020.

* cited by examiner

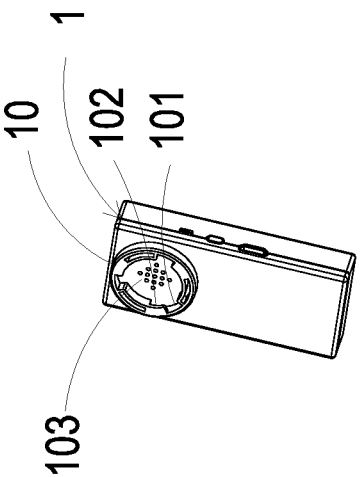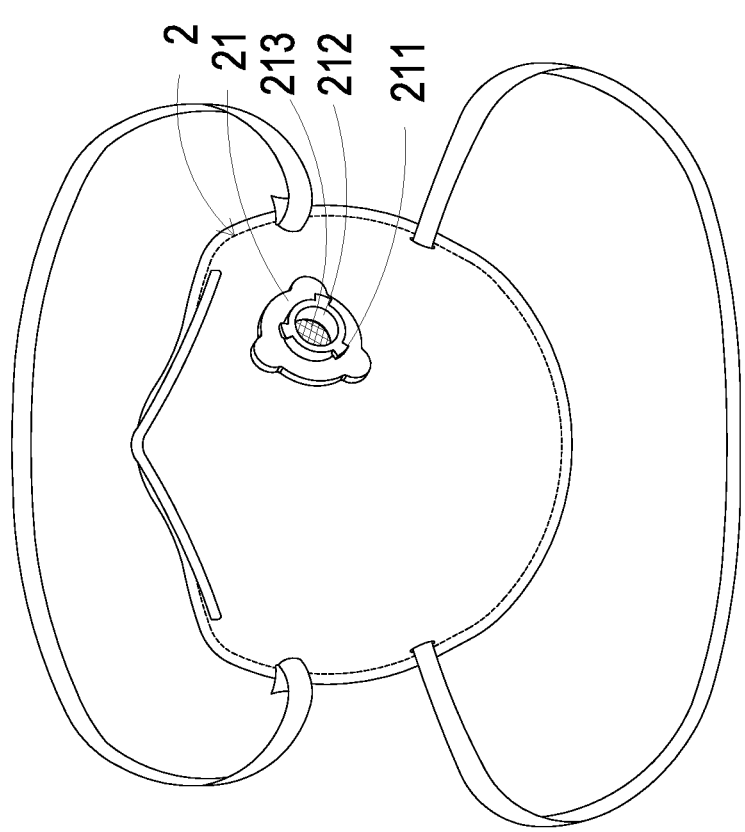
FIG. 1B

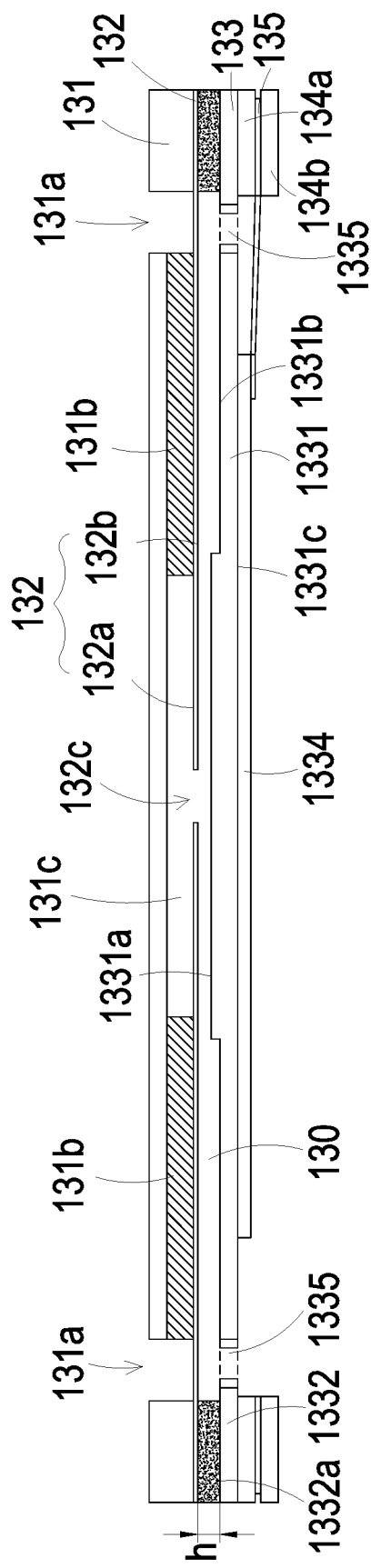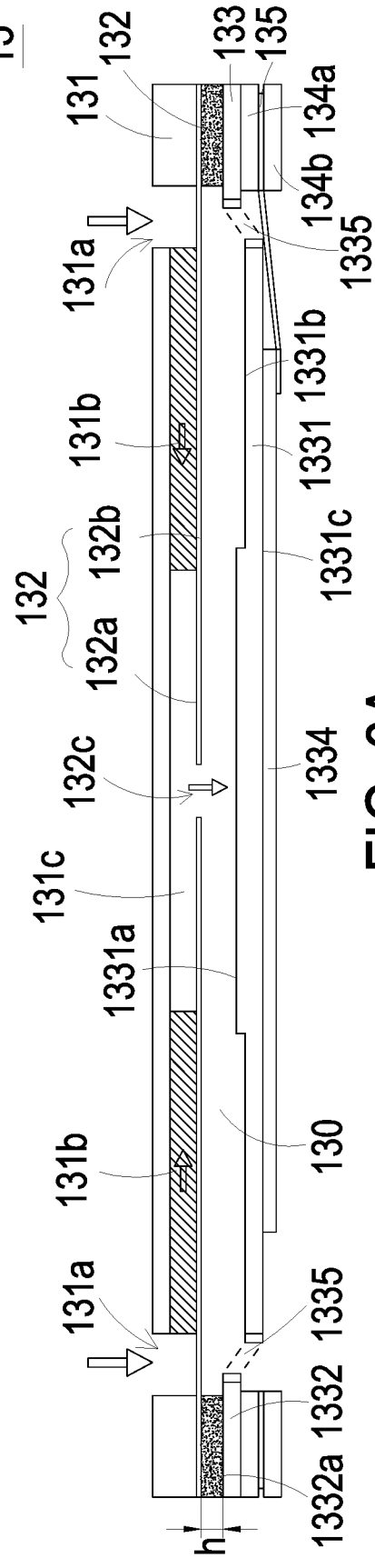

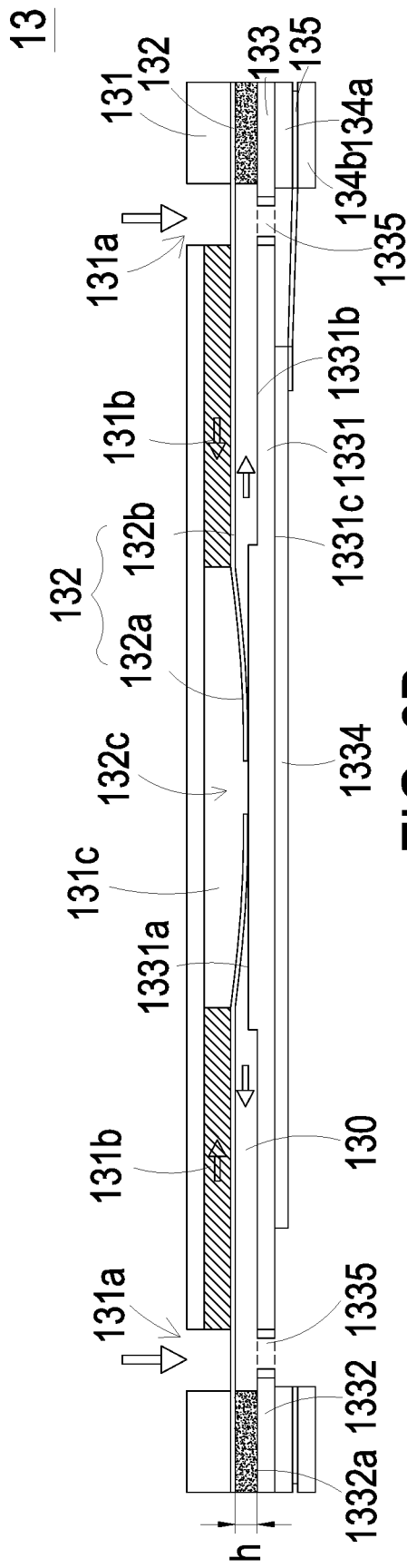
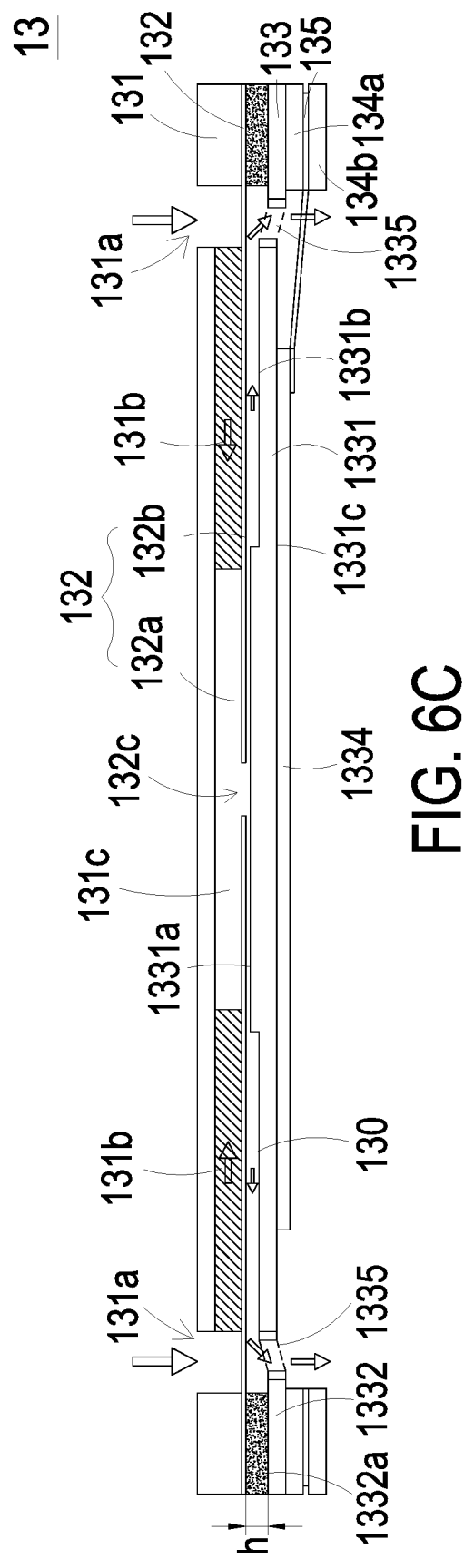

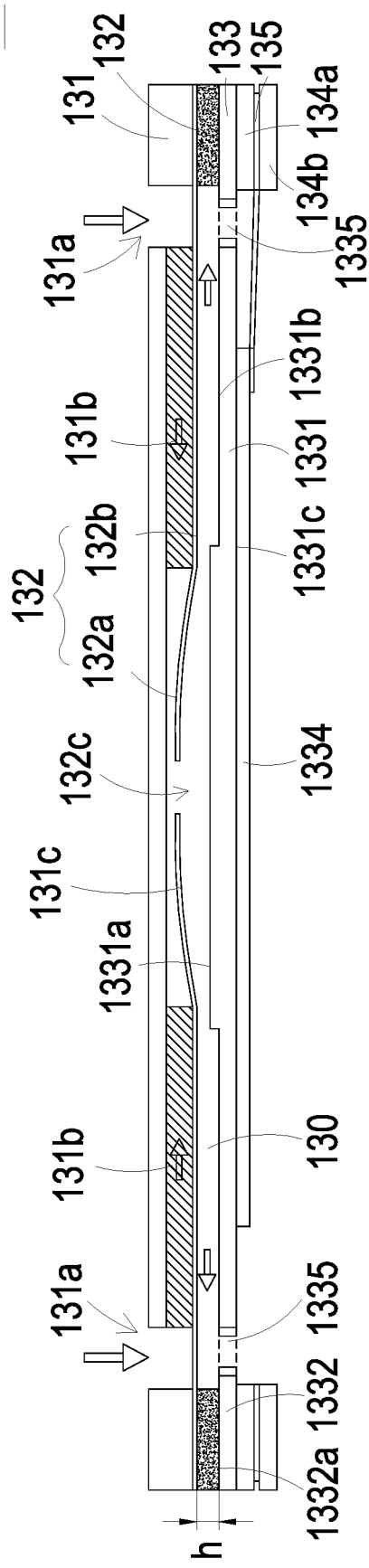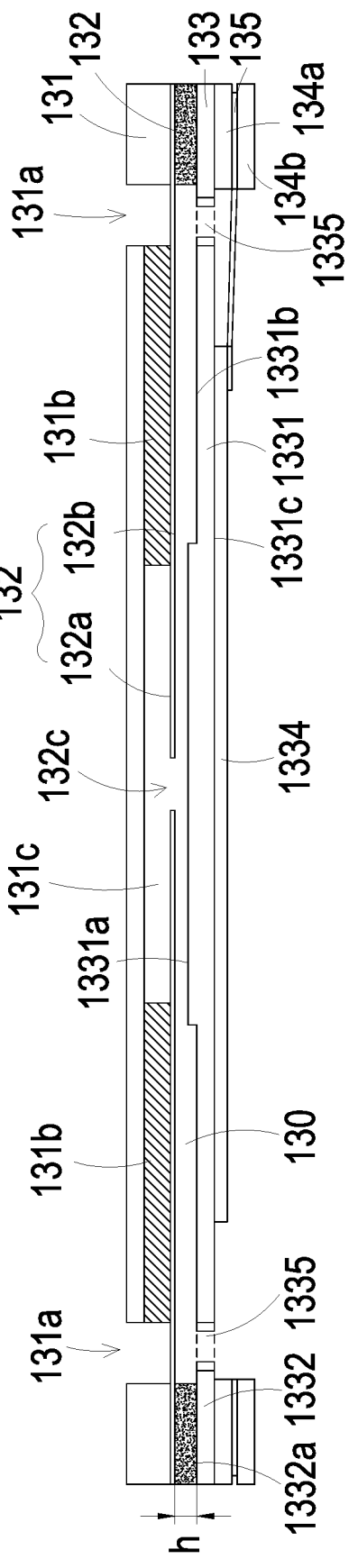

DRIVING AND INFORMATION TRANSMITTING SYSTEM FOR AIR-FILTERING PROTECTION DEVICE

FIELD OF THE INVENTION

The present disclosure relates to an air-filtering protection device, and more particularly to a driving and information transmitting system for an air-filtering protection device, which is capable of combining with an actuating and sensing device for monitoring the environment.

BACKGROUND OF THE INVENTION

Nowadays, people pay much attention to the devices and methods of monitoring the air quality in the environment. For example, it is important to monitor carbon monoxide, carbon dioxide, volatile organic compounds (VOC), PM2.5, and so on. The exposure of these substances in the environment will cause human health problems or even harm the life. Therefore, it is important for every country to develop and implement the environmental monitoring technology.

As known, portable electronic devices are widely used and applied in the modern lives. In addition, the portable electronic devices are indispensable electronic devices. Accordingly, it is feasible to use the portable electronic device to monitor the ambient air. If the portable electronic device is capable of immediately providing people with the monitored information relating to the environment for caution, it may help people escape or prevent from the injury and influence on human health caused by the exposure of the substances described above in the environment. In other words, the portable electronic device is suitably used for monitoring the ambient air in the environment.

Although it is obviously beneficial to make the portable electronic device equipped with environmental sensor for collecting environment data, however, when the environmental sensor is integrated into the electronic device, the monitoring sensitivity and the precision of the environmental sensor should be taken into consideration. For example, the environmental sensor is in contact with air driven by natural convection in the surroundings. In that case, the amount of the air to be monitored by the environmental sensor is neither stable nor uniform. Since the amount of the air for monitoring is neither stable nor uniform, the response time of the environmental sensor is much longer and real-time monitoring is not achieved.

As mentioned above, the portable electronic device is suitably used for monitoring the ambient air in the environment. Therefore, there is a need of providing a driving and information transmitting system for an air-filtering protection device, which is capable of combining with an actuating and sensing device for monitoring the environment and enabling a protection mechanism immediately when the air quality is poor.

SUMMARY OF THE INVENTION

An object of the present disclosure provides a driving and information transmitting system for an air-filtering protection device, which is capable of combining with an actuating and sensing device for monitoring the environment. The air-filtering protection device may include a mask worn by a user to cover the mouth and nose for enclosing air therein. The actuating and sensing device is enabled to transfer the air and discharges the air enclosed by the mask, so that the air circulation is enhanced, the polluted air is exhausted, the temperature and the humidity are adjusted and the air exchanging inside the mask is achieved.

Another object of the present disclosure provides a driving and information transmitting system for an air-filtering protection device, which is capable of combining with an actuating and sensing device for monitoring the environment. The air-filtering protection device may include a mask. The air enclosed by the mask may be also monitored by a sensor of the actuating and sensing device, and capability for monitoring air quality inside the mask is achieved.

A further object of the present invention provides a driving and information transmitting system for an air-filtering protection device, which is capable of combining with an actuating and sensing device for monitoring the environment. The air-filtering protection device may include a mask, such as a filtering mask. According to the condition of the air quality, the air circulation inside the mask is adjusted to generate different flow rates (e.g. amount of air exhaustion) so that the air quality inside the mask is improved. When the sensor monitors that the air quality is poor and harmful to human beings continuously, a notification signal is issued to notify the user for replacing the filtering mask.

A further object of the present invention provides a driving and information transmitting system for an air-filtering protection device, which is capable of combining with an actuating and sensing device for monitoring the environment. The air-filtering protection device may include a mask, such as a filtering mask. The actuating and sensing device can be detached from the filtering mask to form an independent and portable actuating and sensing module for monitoring the air quality. Namely, the actuating and sensing device can monitor the air quality outside the filtering mask and transmit an output data derived from measurement of the air to a connection device. The output data is displayed, stored and transmitted by the connection device. Consequently, the purpose of displaying the information carried by the output data and issuing the notification signal in real time are achieved. Moreover, the information carried by the output data can be transmitted to a cloud database, by which the purpose of constructing and managing the data can be achieved, and in response to that, an air quality notification mechanism and an air quality processing mechanism are enabled. Therefore, the user can wear the air-filtering protection device immediately to prevent from the influence on human health caused by the air pollution.

In accordance with an aspect of the present disclosure, a driving and information transmitting system for an air-filtering protection device is provided and includes a filtering mask, an actuating and sensing device, a power supply device and a connection device. The actuating and sensing device is mounted on the filtering mask and comprises at least one sensor, at least one actuating device, a microprocessor, a power controller and a data transceiver. The actuating device is enabled to transfer air to flow toward the sensor so as to make the air sensed by the sensor. The power supply device is configured to transfer an energy to the power controller, so that the power controller receives the energy and enables the sensor and the actuating device. After monitored information is generated by the at least one sensor and processed into an output data by the microprocessor, the data transceiver receives and transmits the output data to the connection device, and wherein after a control command is given by the connection device, the data transceiver receives and transmits the control command to the microprocessor to control the sensor to perform a sensing operation and enable the actuating device.

The above contents of the present disclosure will become more readily apparent to those ordinarily skilled in the art after reviewing the following detailed description and accompanying drawings, in which:

BRIEF DESCRIPTION OF THE DRAWINGS

FIG. 1B is a schematic partial exploded view illustrating the air-filtering protection device of FIG. 1A;

FIG. 5 is a schematic cross-sectional view illustrating the fluid actuating device as shown in FIGS. 3A and 3B;

FIGS. 6A to 6E schematically illustrate the actions of the fluid actuating device according to the embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
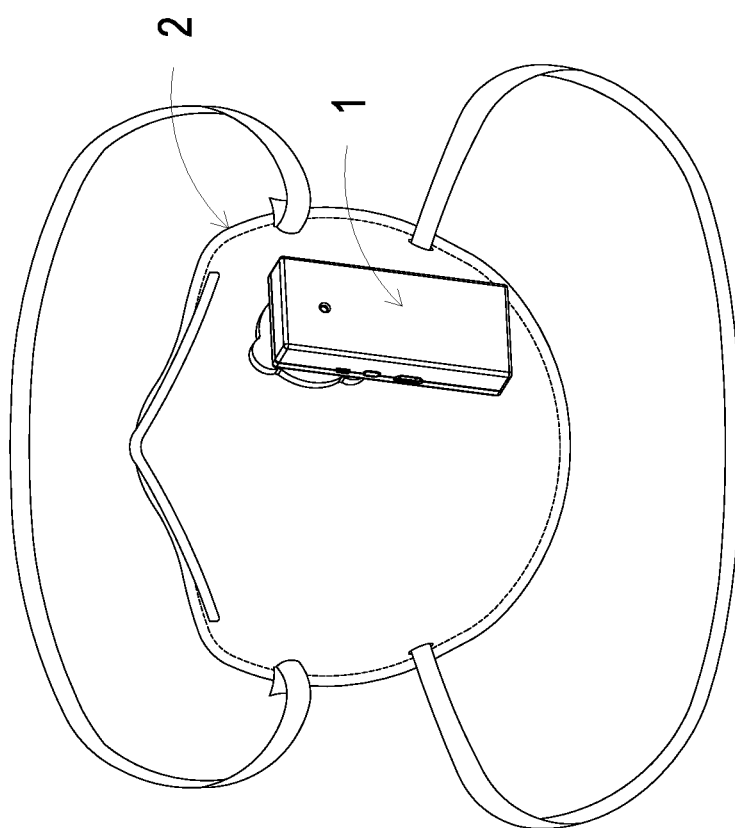
FIG. 1A is a schematic perspective view illustrating the outer appearance of an air-filtering protection device according to an embodiment of the present disclosure.
Figure 7:
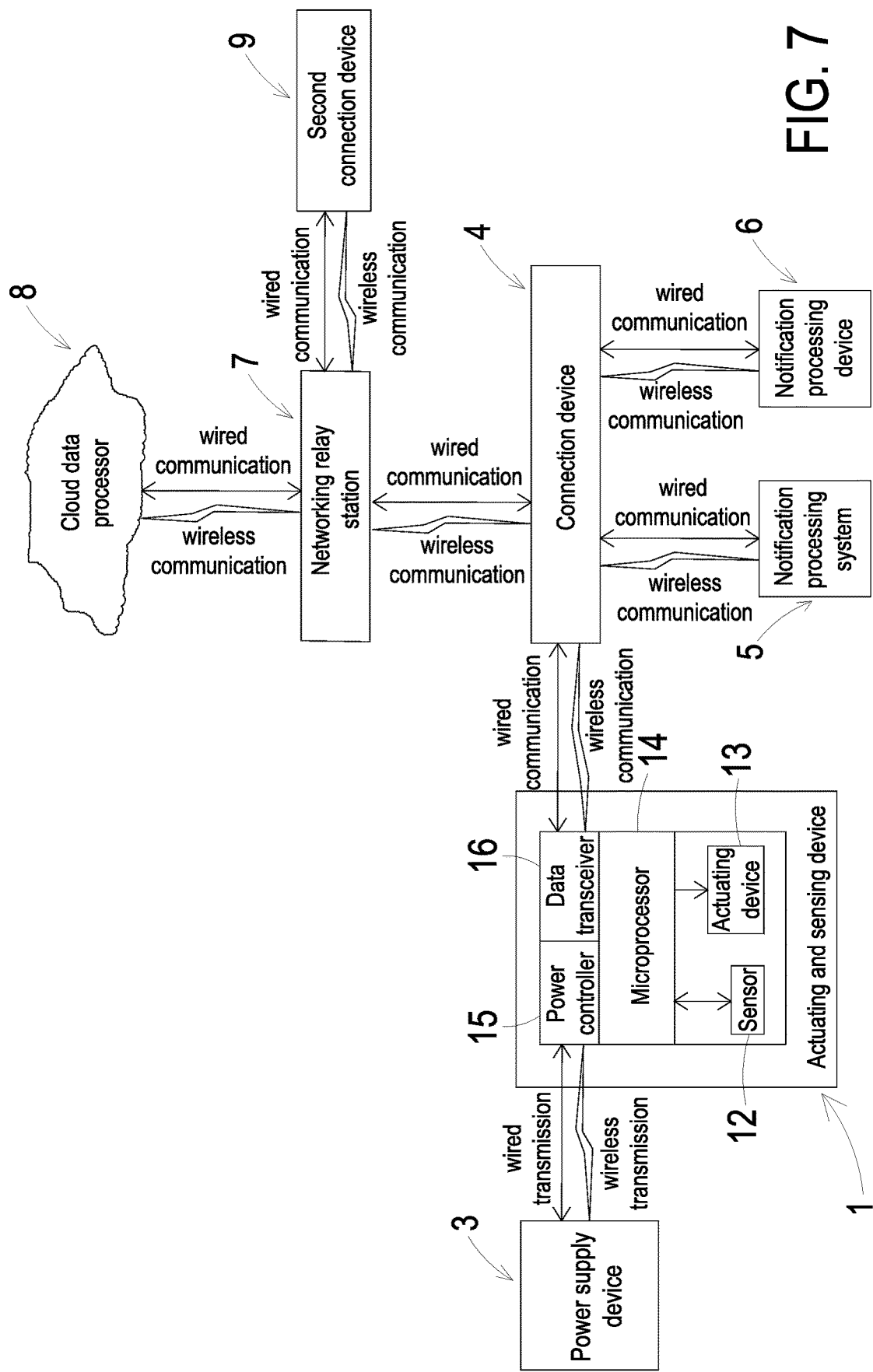
FIG. 7 schematically illustrates the architecture of a driving and information transmitting system for the actuating and sensing device according to an embodiment of the present disclosure.

Please refer to FIGS. 1A, 1B and 7. The present discourse provides a driving and information transmitting system for an air-filtering protection device including at least one filtering mask 2, at least one actuating and sensing device 1, at least one sensor 12, at least one actuating device 13, at least one microprocessor 14, at least one power controller 15, at least one data transceiver 16, at least one air, at least one power supply device 3, at least one energy, at least one connection device 4, at least one output data and at least one control command. The number of the filtering mask 2, the actuating and sensing device 1, the microprocessor 14, the power controller 15, the data transceiver 16, the air, the power supply device 3, the energy, the connection device 4, the output data and the control command is exemplified by one for each in the following embodiments but not limited thereto. It is noted that each of the filtering mask 2, the actuating and sensing device 1, the microprocessor 14, the power controller 15, the data transceiver 16, the air, the power supply device 3, the energy, the connection device 4, the output data and the control command can also be provided in plural numbers.

Please refer to FIGS. 1A and 1B. The air-filtering protection device of the present disclosure includes a filtering mask 2 and an actuating and sensing device 1. The filtering mask 2 is worn by a user and used to filter air. For example, the filtering mask 2 may be a mouth mask, which has a covering surface made of a non-woven cloth, for filtering air, or the filtering mask 2 may be a wearable face mask, which has a filtering element for filtering air. Moreover, the filtering mask 2 includes a first coupling element 21. The first coupling element 21 may be a fastening element having one or more tenon 211. The first coupling element 21 has a first air channel 212 running through the inner surface and the outer surface of the filtering mask 2. A filtering element 213 is disposed in the first air channel 212 to seal the first air channel 212 so as to filter air. Consequently, the filtering mask 2 is wearable by the user to cover the mouth and nose of the user completely for achieving the function of filtering air. The actuating and sensing device 1 includes a second coupling element 10. The second coupling element 10 may be a fastening element with one or more recess 101 and one or more engaging slot 102. The recess 101 is in communication with the engaging slot 102. The second coupling element 10 includes a second air channel 103 being in communication with the interior of the actuating and sensing device 1 for allowing the air to be introduced into the interior of the actuating and sensing device 1.

For mounting and positioning the actuating and sensing device 1 on the filtering mask 2, the recess 101 of the second coupling element 10 is aligned with the tenon 211 of the first coupling element 21, and then the second coupling element 10 is rotated along a locking direction which allows the tenon 212 of the first coupling element 21 to be fitted into the engaging slot 102 of the second coupling element 10. Consequently, the actuating and sensing device 1 is mounted and positioned on the filtering mask 2. Namely, the tenon 211 of the first coupling element 21 is engaged with the corresponding engaging slot 102 of the second coupling element 10 so that the actuating and sensing device 1 is mounted and positioned on the filtering mask 2 by engagement. On the contrary, after the second coupling element 10 is rotated along an unlocking direction which allows the recess 101 of the second coupling element 10 to align with the tenon 211 of the first coupling element 21, disengagement between the second coupling element 10 and the first coupling element 11 is accomplished. Consequently, the actuating and sensing device 1 is disassembled from the filtering mask 2 and available independently. In other words, the actuating and sensing device 1 is a portable device for monitoring the air quality.

Please refer to FIG. 7. The actuating and sensing device 1 includes at least one sensor 12, at least one actuating device 13, a microprocessor 14, a power controller 15 and a data transceiver 16. The power controller 15 receives energy and transfers the energy to the sensor 12 and the actuating device 13 to enable the sensor 12 and the actuating device 13. The data transceiver 16 receives and transmits signal.

An example of the sensor 12 includes but is not limited to a temperature sensor, a volatile organic compound sensor (e.g., a sensor for measuring formaldehyde or ammonia gas), a particulate sensor (e.g., a PM2.5 particle sensor), a carbon monoxide sensor, a carbon dioxide sensor, an oxygen sensor, an ozone sensor, any other appropriate gas sensor, a humidity sensor, a water content sensor, a substance sensor (e.g., a sensor for measuring compounds or biological substances in liquid or air), a water quality sensor, any other appropriate liquid sensor, a light sensor, or the combination thereof. Alternatively, the sensor 12 includes but is not limited to a virus sensor, a bacterial sensor, a microbiological sensor or combinations thereof.

The actuating device 13 is a driving device capable of driving a desired system in response to a control signal. An example of the actuating device 13 includes but is not limited to at least one selected from the group consisting of an electric actuating device, a magnetic actuating device, a thermal actuating device, a piezoelectric actuating device, a fluid actuating device and combinations thereof. For example, the electric actuating device is an electric actuating device of a DC motor, an AC motor or a step motor, the magnetic actuating device is an magnetic actuating device of a magnetic coil motor, the thermal actuating device is a thermal actuating device of a heat pump, the piezoelectric actuating device is a piezoelectric actuating device of a piezoelectric pump, and the fluid actuating device is a fluid actuating device of a gas pump or a liquid pump.

Please refer to FIGS. 2A, 2B, 2C and 2D. The sensor 12 and the actuating device 13 are integrated together to form a modular structure. The actuating device 13 is disposed on one side of the sensor 12. The actuating device 13 includes at least one guiding channel 17. When the actuating device 13 is enabled to transfer the air, the air is transferred through the guiding channel 17 and flows toward the sensor 12. Consequently, the air is sensed by the sensor 12. Since the air is guided to the sensor 12 by the actuating device 13 and the sensor 12 is provided with the amount of the air stably and uniformly, the response of the sensor 12 is largely reduced, thereby monitoring the air with precision.

Please refer to FIGS. 2A, 2B, 2C and 2D. The actuating and sensing device 1 further includes a carrier 11, which is a platform for integrating the sensor 12 with the actuating device 13. For example, the carrier 11 may be a substrate such as a printed circuit board (PCB), upon which the sensor(s) 12 and the actuating device(s) 13 may be disposed in an array. In a variant example, the carrier 11 may be an application-specific integrated circuit (ASIC). The actuating device 13 is packaged on the carrier 11. In another variant example, the carrier 11 may be a system on chip (SOC). The sensor 12 is deposited on the carrier 11. It is noted that the carrier 11 is not limited to the above-mentioned embodiments and may be other platform for integrating the sensor 12 and the actuating device 13.

In an embodiment, the actuating device 13 is a fluid actuating device. The fluid actuating device 13 may be a driving structure of a piezoelectric pump or a driving structure of a micro-electro-mechanical system (MEMS) pump. Hereinafter, the actions of the fluid actuating device 13 of a piezoelectric pump will be described as follows.

Please refer to FIGS. 3A and 3B again. The fluid actuating device 13 includes a gas inlet plate 131, a resonance plate 132, a piezoelectric actuator 133, a first insulation plate 134a, a conducting plate 135 and a second insulation plate 134b. The piezoelectric actuator 133 is aligned with the resonance plate 132. The gas inlet plate 131, the resonance plate 132, the piezoelectric actuator 133, the first insulation plate 134a, the conducting plate 135 and the second insulation plate 134b are stacked on each other sequentially. After the above components are combined together, the cross-sectional view of the resulting structure of the fluid actuating device 13 is shown in FIG. 5.

The gas inlet plate 131 includes at least one inlet 131a. Preferably but not exclusively, the gas inlet plate 131 includes four inlets 131a. The inlets 131a run through the gas inlet plate 131. In response to the action of the atmospheric pressure, the air can be introduced into the fluid actuating device 13 through the at least one inlet 131a. Moreover, at least one convergence channel 131b is formed on a first surface of the gas inlet plate 131, and is in communication with the at least one inlet 131a on a second surface of the gas inlet plate 131. Moreover, a central cavity 131c is located at the intersection of the convergence channels 131b. The central cavity 131c is in communication with the at least one convergence channel 131b such that the air from the at least one inlet 131a would be introduced into the at least one convergence channel 131b and is guided to the central cavity 131c. In this embodiment, the at least one inlet 131a, the at least one convergence channel 131b and the central cavity 131c of the gas inlet plate 131 are integrally formed from a single structure. The central cavity 131c forms a convergence chamber for temporarily storing the air. In some embodiments, the gas inlet plate 131 may be, for example, made of stainless steel. Moreover, the depth of the convergence chamber defined by the central cavity 131c may be equal to the depth of the at least one convergence channel 131b. The resonance plate 132 is made of a flexible material. The resonance plate 132 has a central aperture 132c aligned with the central cavity 131c of the gas inlet plate 131 which allows the air to be transferred therethrough. In other embodiments, the resonance plate 132 may be, for example, made of copper.

The piezoelectric actuator 133 includes a suspension plate 1331, an outer frame 1332, at least one bracket 1333 and a piezoelectric plate 1334. The piezoelectric plate 1334 is attached on a first surface 1331c of the suspension plate 1331. In response to an applied voltage, the piezoelectric plate 1334 is subjected to a deformation. When the piezoelectric plate 1334 is subjected to the deformation, it facilitates a bending vibration of the suspension plate 1331. In this embodiment, the at least one bracket 1333 is connected between the suspension plate 1331 and the outer frame 1332, while the two ends of the bracket 1333 are connected to the outer frame 1332 and the suspension plate 1331 respectively that the bracket 1333 can elastically support the suspension plate 1331. At least one vacant space 1335 is formed between the bracket 1333, the suspension plate 1331 and the outer frame 1332. The at least one vacant space 1335 is in communication with the guiding channel 17 for allowing the air to go through. The type of the suspension plate 1331 and the outer frame 1332 and the type and the number of the at least one bracket 1333 may be varied according to the practical requirements. The outer frame 1332 is arranged around the suspension plate 1331. Moreover, a conducting pin 1332c is protruded outwardly from the outer frame 1332 so as to be electrically connected to an external circuit (not shown).

Figure 4:
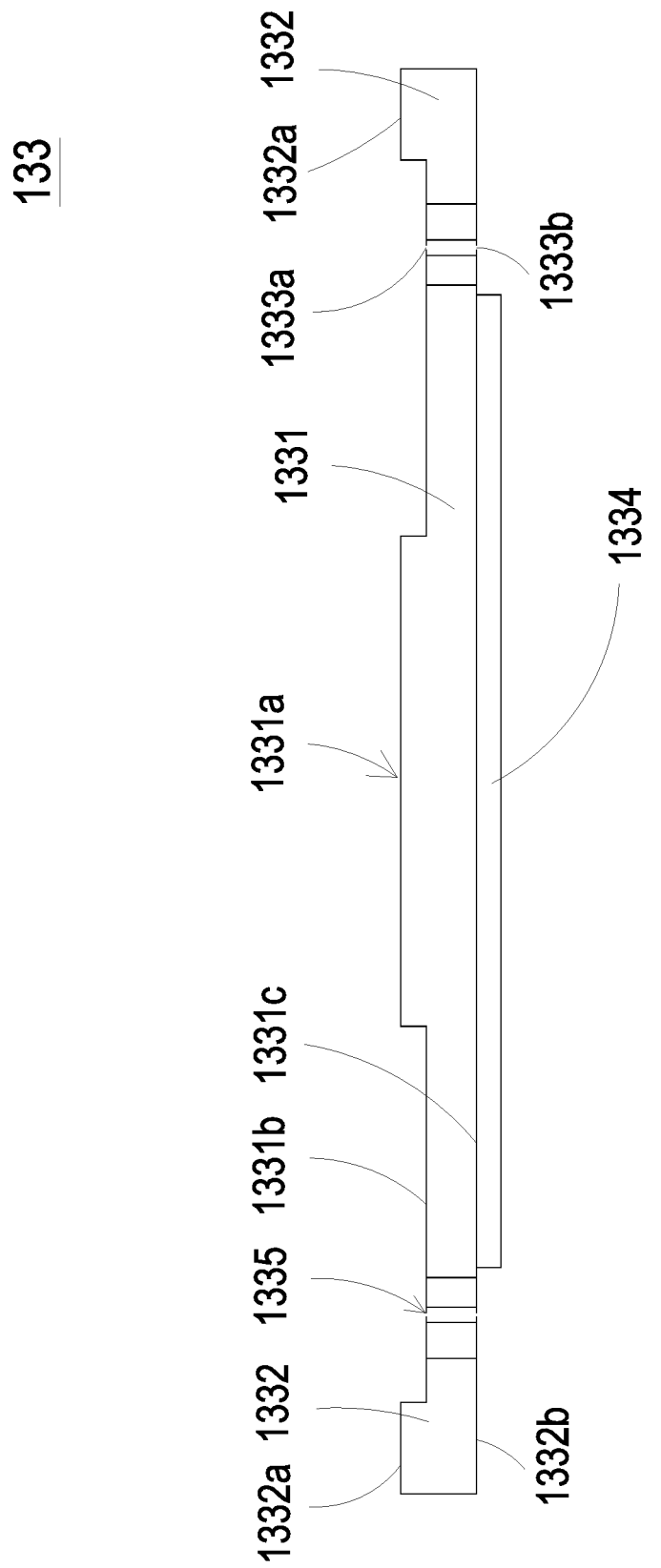
FIG. 4 is a schematic cross-sectional view illustrating the piezoelectric actuator of the fluid actuating device as shown in FIGS. 3A and 3B.

As shown in FIG. 4, the suspension plate 1331 has a bulge 1331a that makes the suspension plate 1331 a stepped structure. The bulge 1331a is formed on a second surface 1331b of the suspension plate 1331. The bulge 1331a may be a circular convex structure. A top surface of the bulge 1331a of the suspension plate 1331 is coplanar with a second surface 1332a of the outer frame 1332, while the second surface 1331b of the suspension plate 1331 is coplanar with a second surface 1333a of the bracket 1333. Moreover, there is a specific depth from the bulge 1331a of the suspension plate 1331 (or the second surface 1332*a* of the outer frame 1332) to the second surface 1331*b* of the suspension plate 1331 (or the second surface 1333*a* of the bracket 1333). A first surface 1331*c* of the suspension plate 1331, a first surface 1332*b* of the outer frame 1332 and a first surface 1333*b* of the bracket 1333 are coplanar with each other. The piezoelectric plate 1334 is attached on the first surface 1331*c* of the suspension plate 1331. In some other embodiments, the suspension plate 1331 may be a square plate structure with two flat surfaces, but the type of the suspension plate 1331 may be varied according to the practical requirements. In this embodiment, the suspension plate 1331, the at least one bracket 1333 and the outer frame 1332 may be integrally formed from a metal plate (e.g., a stainless steel plate). In an embodiment, the length of a side of the piezoelectric plate 1334 is smaller than the length of a side of the suspension plate 1331. In another embodiment, the length of a side of the piezoelectric plate 1334 is equal to the length of a side of the suspension plate 1331. Similarly, the piezoelectric plate 1334 is a square plate structure corresponding to the suspension plate 1331 in terms of design.

Figure 3A:
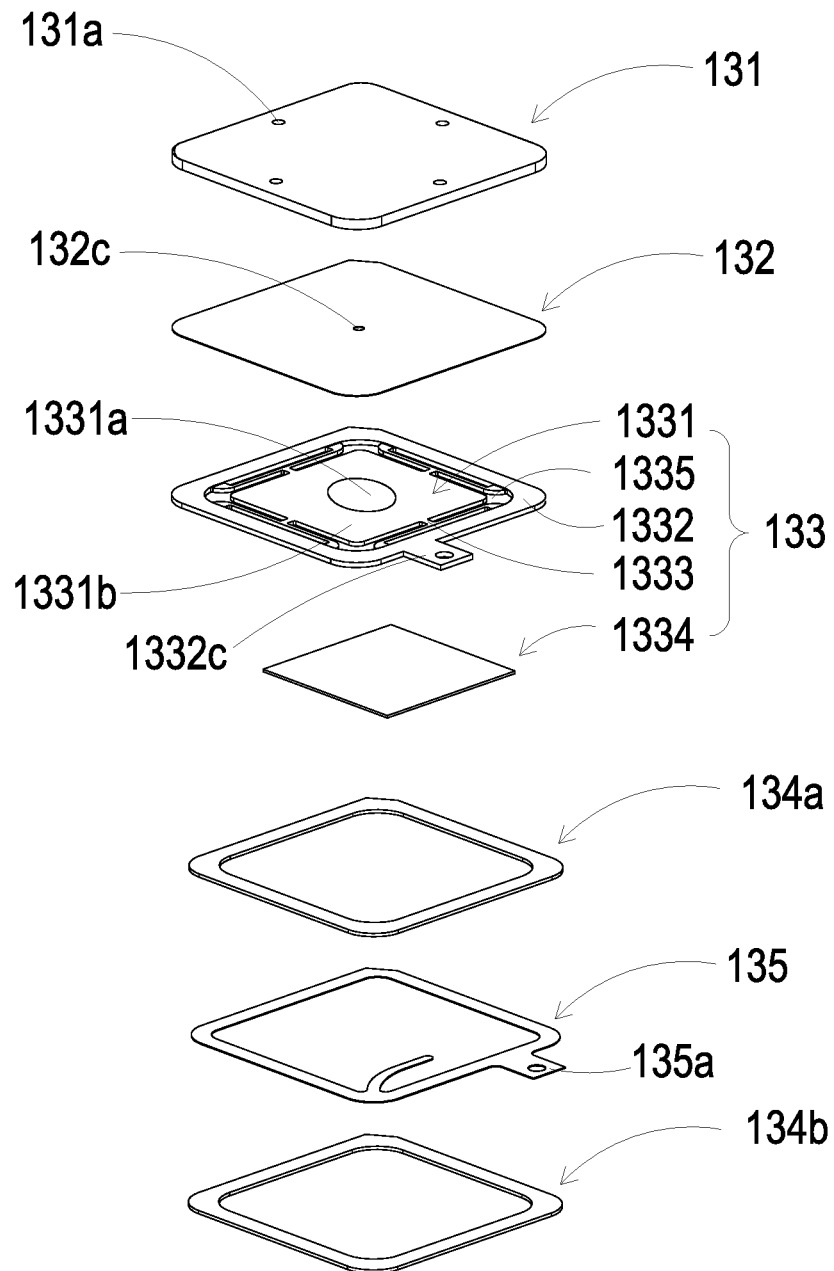
FIG. 3A is a schematic exploded view illustrating a fluid actuating device of the present disclosure.
Figure 3B:
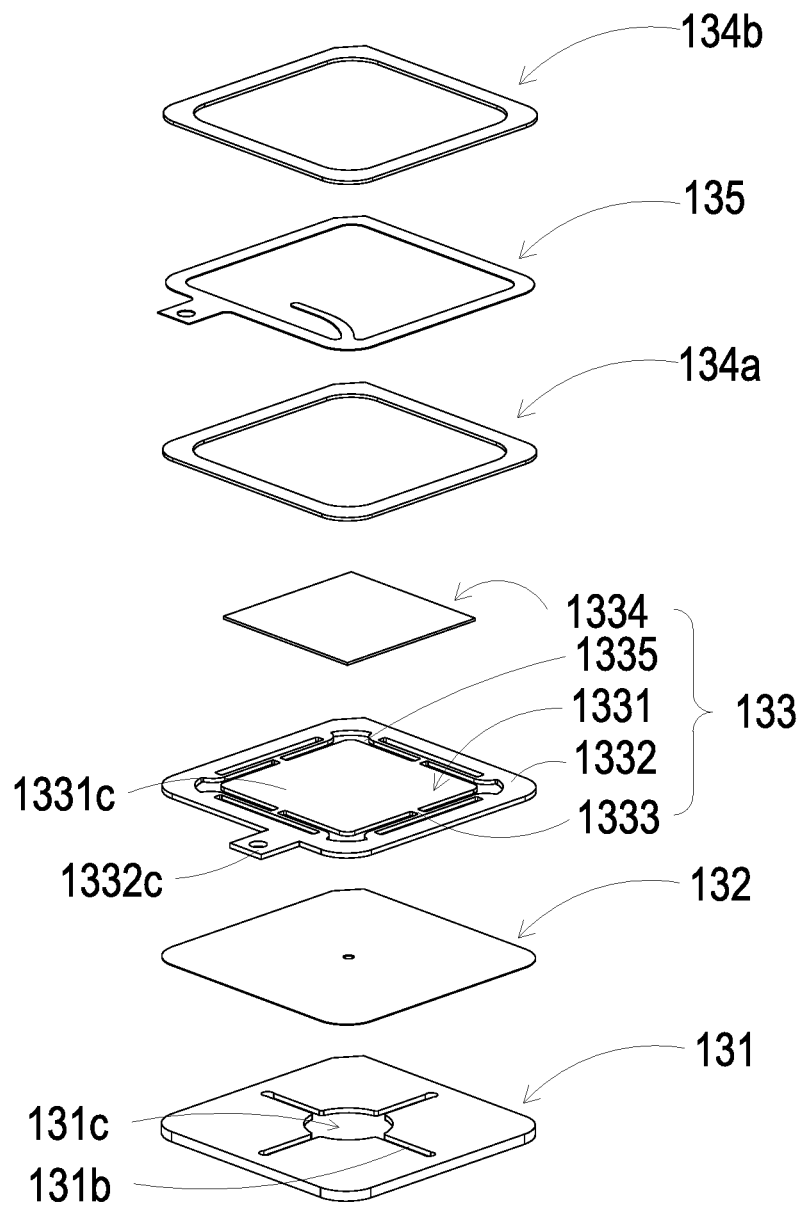
FIG. 3B is a schematic exploded view illustrating the fluid actuating device of FIG. 3A and taken along another viewpoint.

In this embodiment, the first insulation plate 134*a*, the conducting plate 135 and the second insulation plate 134*b* of the fluid actuating device 13 are stacked on each other sequentially and located under the piezoelectric actuator 133, as shown in FIG. 3A. The profiles of the first insulation plate 134*a*, the conducting plate 135 and the second insulation plate 134*b* substantially match the profile of the outer frame 1332 of the piezoelectric actuator 133. In some embodiments, the first insulation plate 134*a* and the second insulation plate 134*b* may be made of an insulating material (e.g. a plastic material) for providing insulating efficacy. In other embodiment, the conducting plate 135 may be made of an electrically conductive material (e.g. a metallic material) for providing electrically conducting efficacy. In this embodiment, the conducting plate 135 may have a conducting pin 135*a* disposed thereon so as to be electrically connected to an external circuit (not shown).

Please refer to FIG. 5. In an embodiment, the gas inlet plate 131, the resonance plate 132, the piezoelectric actuator 133, the first insulation plate 134*a*, the conducting plate 135 and the second insulation plate 134*b* of the fluid actuating device 13 are stacked on each other sequentially. Moreover, there is a gap h between the resonance plate 132 and the outer frame 1332 of the piezoelectric actuator 133. In this embodiment, the gap h between the resonance plate 132 and the outer frame 1332 of the piezoelectric actuator 133 may be filled with a filler (e.g. a conductive adhesive) so that a depth from the resonance plate 132 to the bulge 1331*a* of the suspension plate 1331 of the piezoelectric actuator 133 can be maintained. The gap h ensures the proper distance between the resonance plate 132 and the bulge 1331*a* of the suspension plate 1331 of the piezoelectric actuator 133, so that the air can be transferred quickly, the contact interference is reduced and the generated noise is largely reduced. In some embodiments, alternatively, the height of the outer frame 1332 of the piezoelectric actuator 133 is increased, so that a gap is formed between the resonance plate 132 and the piezoelectric actuator 133.

Please refer to FIGS. 2C, 2D, 3A, 3B and 5. After the gas inlet plate 131, the resonance plate 132 and the piezoelectric actuator 133 are combined together, a movable part 132*a* and a fixed part 132*b* of the resonance plate 132 are defined. The movable part 132*a* is around the central aperture 132*c*. The convergence chamber for converging the air may be further defined by the movable part 132*a* of the resonance plate 132 and the gas inlet plate 131 collaboratively. Moreover, a first chamber 130 is formed between the resonance plate 132 and the piezoelectric actuator 133 for temporarily storing the air. Through the central aperture 132*c* of the resonance plate 132, the first chamber 130 is in communication with the convergence chamber formed within the central cavity 131*c* of the gas inlet plate 131. The peripheral regions of the first chamber 130 are in communication with the guiding channel 17 through the vacant space 1335 between the brackets 1333 of the piezoelectric actuator 133.

FIGS. 6A to 6E schematically illustrate the actions of the fluid actuating device of the actuating and sensing device according to the embodiment of the present disclosure. Please refer to FIGS. 2C, 2D, 3A, 3B, 5 and FIGS. 6A to 6E. The actions of the fluid actuating device 13 will be described as follows. When the fluid actuating device 13 is enabled, the piezoelectric actuator 133 vibrates along a vertical direction in a reciprocating manner by using the bracket 1333 as a fulcrum. Please refer to FIG. 6A, the piezoelectric actuator 133 vibrates downwardly in response to the applied voltage. Since the resonance plate 132 is light and thin, the resonance plate 132 vibrates along the vertical direction in the reciprocating manner in resonance with the piezoelectric actuator 133. More specifically, a region of the resonance plate 132 spatially corresponding to the central cavity 131*c* of the gas inlet plate 131 is also subjected to a bending deformation. The region of the resonance plate 132 corresponding to the central cavity 131*c* of the gas inlet plate 131 is the movable part 132*a* of the resonance plate 132. When the piezoelectric actuator 133 deforms downwardly during vibration, the movable part 132*a* of the resonance plate 132 is subjected to the bending deformation because the movable part 132*a* of the resonance plate 132 is pushed by the air and vibrates in response to the piezoelectric actuator 133. In response to the downward deformation of the piezoelectric actuator 133 during vibration, the air is fed into the at least one inlet 131*a* of the gas inlet plate 131. Then, the air is transferred to the central cavity 131*c* of the gas inlet plate 131 through the at least one convergence channel 131*b*. Then, the air is transferred through the central aperture 132*c* of the resonance plate 132 spatially corresponding to the central cavity 131*c*, and introduced downwardly into the first chamber 130. As the piezoelectric actuator 133 is enabled, the resonance plate 132 is in resonance with the piezoelectric actuator 133. Consequently, the resonance plate 132 vibrates along the vertical direction in the reciprocating manner. As shown in FIG. 6B, during the vibration of the movable part 132*a* of the resonance plate 132 at this stage, the movable part 132*a* of the resonance plate 132 moves down to contact and attach on the bulge 1331*a* of the suspension plate 1331 of the piezoelectric actuator 133, and a distance from the fixed part 132*b* of the resonance plate 132 to a region of the suspension plate 1331 except the bulge 1331*a* remains the same. Owing to the deformation of the resonance plate 132 described above, a middle communication space of the first chamber 130 is closed, and the volume of the first chamber 130 is compressed. Under this circumstance, the pressure gradient occurs to push the air in the first chamber 130 toward peripheral regions of the first chamber 130, and flowing downwardly through the vacant space 1335 of the piezoelectric actuator 133. Referring to FIG. 6C, the movable part 132*a* of the resonance plate 132 returns to its original position when the piezoelectric actuator 133 deforms upwardly during vibration. Consequently, the volume of the first chamber 130 is continuously compressed to generate the pressure gradient which makes the air in the first chamber 130 continuously pushed toward peripheral regions. Meanwhile, the air is continuously fed into the at least one inlet 131*a* of the gas inlet plate 131, and transferred to the central cavity 131*c*. Then, as shown in FIG. 6D, the resonance plate 132 moves upwardly, which is cause by the resonance of upward motion of the piezoelectric actuator 133. That is, the movable part 132*a* of the resonance plate 132 is also vibrated upwardly. Consequently, it decreases the current of the air from the at least one inlet 131*a* of the gas inlet plate 131 into the convergence chamber formed within the central cavity 131*c*. At last, as shown in FIG. 6E, the movable part 132*a* of the resonance plate 132 has returned to its original position. As the embodiments described above, when the resonance plate 132 vibrates along the vertical direction in the reciprocating manner, the gap h between the resonance plate 132 and the piezoelectric actuator 133 is helpful to increase the maximum displacement along the vertical direction during the vibration. In other words, the configuration of the gap h between the resonance plate 132 and the piezoelectric actuator 133 can increase the amplitude of vibration of the resonance plate 132. Consequently, a pressure gradient is generated in the guiding channel 17 of the fluid actuating device 13 to facilitate the air to flow at a high speed. Moreover, since there is an impedance difference between the feeding direction and the exiting direction, the air can be transmitted from the inlet side to the outlet side. Even if a gas pressure (which may impede the air flow) exists at the outlet side, the fluid actuating device 13 still has the capability of pushing the air to the guiding channel 17 while achieving the silent efficacy. The steps of FIGS. 6A to 6E may be done repeatedly. Consequently, air circulation is promoted in which the ambient air is transferred from the outside to the inside by the fluid actuating device 13.

Figure 2A:
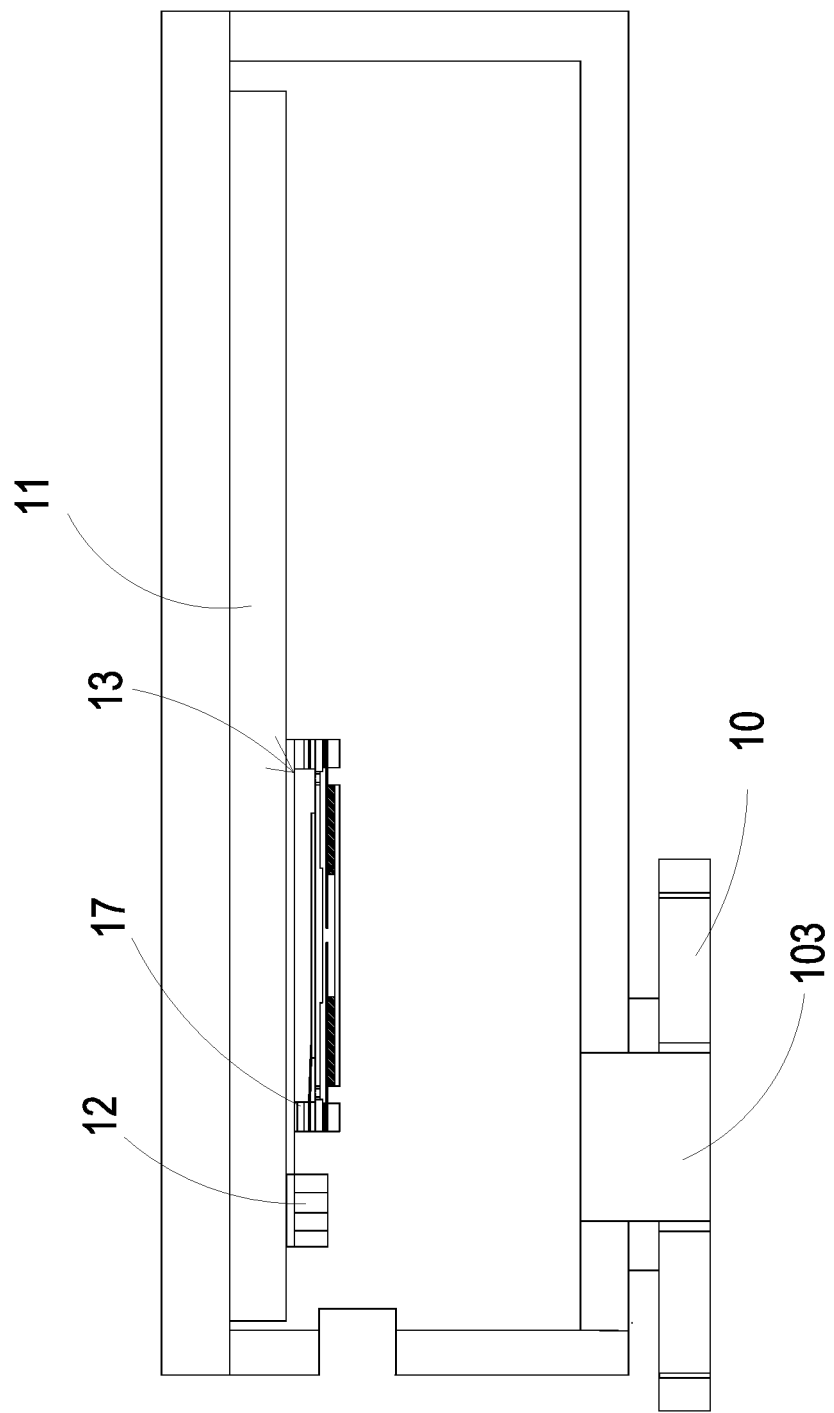
FIG. 2A is a schematic cross-sectional view illustrating the actuating and sensing device of the air-filtering protection device of FIG. 1A.
Figure 2B:
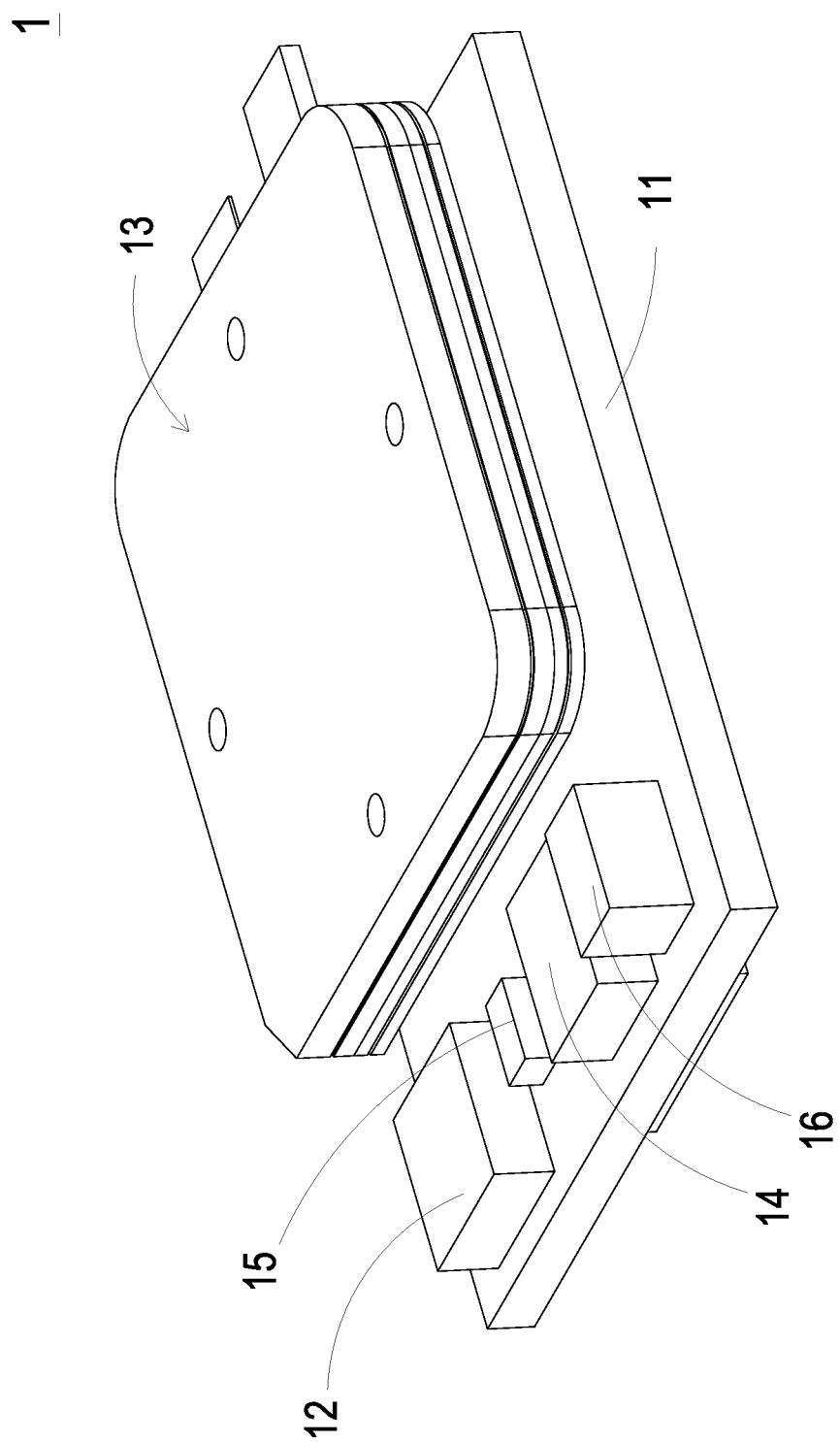
FIG. 2B is a schematic perspective view illustrating the outer appearance of the actuating and sensing device of the air-filtering protection device of FIG. 2A.
Figure 2C:
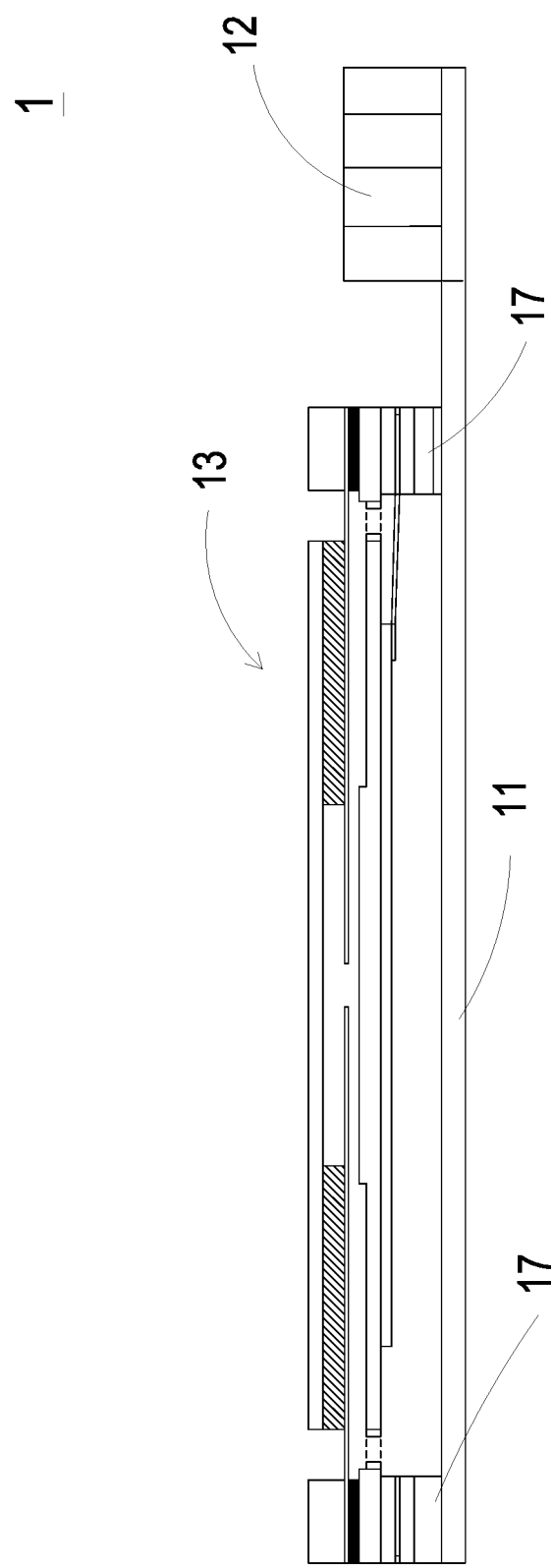
FIG. 2C is an enlarged cross-sectional view illustrating the actuating and sensing device of the air filtering protection device of FIG. 2A.
Figure 2D:
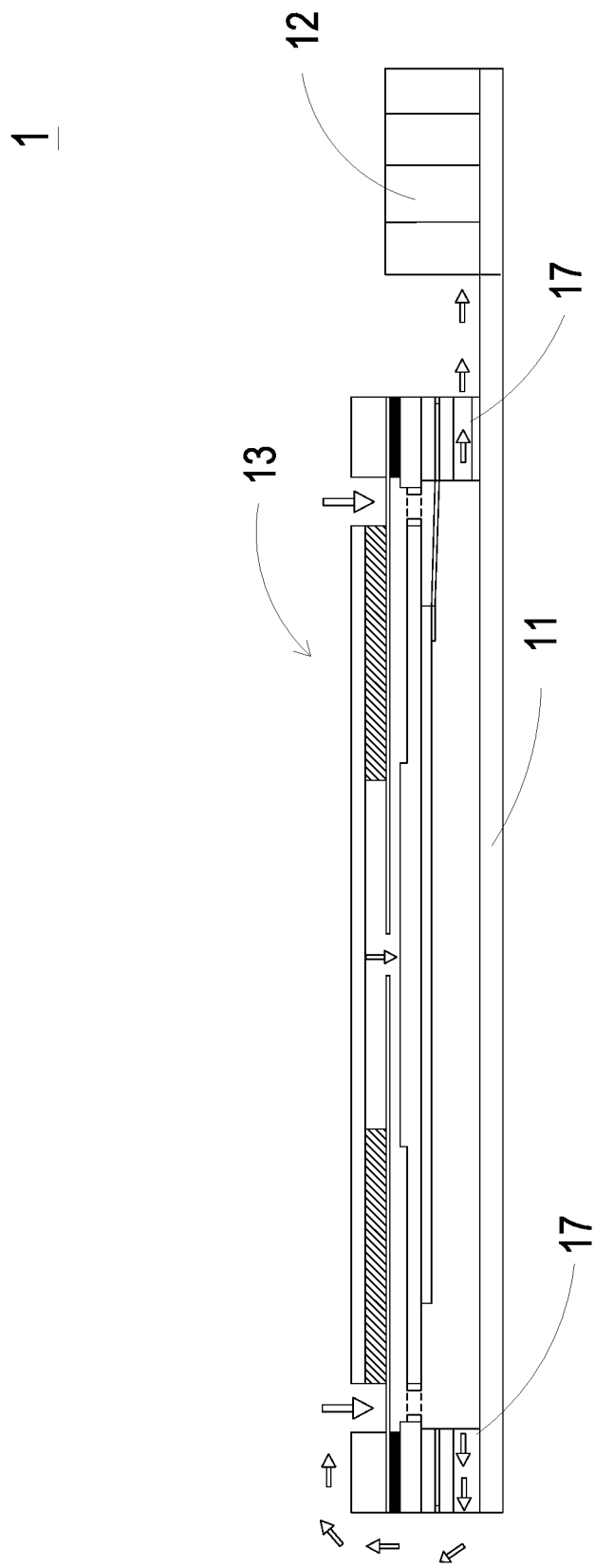
FIG. 2D is a schematic cross-sectional view illustrating the actions of the fluid actuating device of the actuating and sensing device according to the embodiment of the present disclosure.

As mentioned above, the actions of the fluid actuating device 13 is further described as below. The gas inlet plate 131, the resonance plate 132, the piezoelectric actuator 133, the first insulation plate 134*a*, the conducting plate 135 and the second insulation plate 134*b* are sequentially stacked. As shown in FIGS. 2C and 2D, the fluid actuating device 13 is disposed on the carrier 11 and the guiding channel 17 is formed between the fluid actuating device 13 and the carrier 11. The guiding channel 17 is disposed on one side of the sensor 12. The fluid actuating device 13 is enabled to compress the air, and allows the air to be exhausted through the guiding channel 17 along the direction indicated by the arrow (see FIG. 2D), by which the air is sensed by the sensor 12. Therefore, the air is able to be guided to the sensor 12 which is provided with the amount of the air stably and uniformly by the fluid actuating device. Since the sensor 12 is provided with the amount of the air stably and uniformly, the response time to the fluid is largely reduced, thereby monitoring the fluid with precision.

FIG. 7 schematically illustrates the architecture of a driving and information transmitting system for the actuating and sensing device according to an embodiment of the present disclosure. As shown in FIG. 7, the power controller 15 of the actuating and sensing device 1 is used to store and output energy. The power controller 15 transfers the energy to the sensor 12 and the actuating device 13 so as to enable the sensor 12 to perform a sensing operation and the actuating device 13 to perform an actuating operation under control. The actuating and sensing device 1 may not be equipped with a power source itself. Rather, the actuating and sensing device may be coupled to an external power supply device 3 for energy transfer, thereby enabling the sensor 12 and the actuating device 13 for operation. Accordingly, the configuration described above saves a lot of space when installing the entire module, and the purpose of minimizing the design of the module is achieved.

As mentioned above, the power controller 15 transfers the energy to power the sensor 12 and the actuating device 13 to enable the sensor 12 to perform a sensing operation and the actuating device 13 to perform an actuating operation under control. In an embodiment, the power supply device 3 may transfer the energy to the power controller 15 through a wired transmission path. For example, the power supply device 3 is a charger, and the power supply device 3 may transfer the energy to the power controller 15 through the wired transmission path. Alternatively, the power supply device 3 is a chargeable battery, and the power supply device 3 may transfer the energy to the power controller 15 through the wired transmission path. In another embodiment, the power supply device 3 may transfer the energy to the power controller 15 through a wireless transmission path. For example, the power supply device 3 is a charger with a wireless charging component (or an induction charging component), and the power supply device 3 may transfer the energy to the power controller 15 through the wireless transmission path. Alternatively, the power supply device 3 is a chargeable battery with a wireless charging component (or an induction charging component), and the power supply device 3 may transfer the energy to the power controller 15 through the wireless transmission path. In another embodiment, the power supply device 3 is a portable electronic device with wireless charging/discharging capability (e.g., a mobile phone). For example, the mobile phone has a wireless charging component (or an induction charging component), and the mobile phone may transfer the energy to the power controller 15 through the wireless transmission path.

In an embodiment, the power controller 15 further includes a chargeable element (not shown) for receiving and storing the energy. The chargeable element of the power controller 15 receives the energy from the power supply device 3 transferred through a wired transmission path or a wireless transmission path. Then, the chargeable element stores the energy, and outputs the energy is transferred to the sensor 12 and the actuating device 13 for powering the sensor 12 to perform a sensing operation and powering the actuating device 13.

The microprocessor 14 performs a calculation operation for converting the monitored data to an output data. The data transceiver 16 receives the output data, and sends it to the connection device 4 through transmission, so that the connection device 4 can display and store the information carried by the output data, or can transmit the information carried by the output data to a storage device (not shown) of the connection device 4 for storing or processing. In an embodiment, the connection device 4 is in communication with a notification processing system 5 to actively (i.e. directly notify) or passively (i.e. operated by a user to whom the information carried by the output data is provided) enable an air quality notification mechanism, e.g., an instant air quality map informs people to avoid away or to wear masks. In another embodiment, the connection device 4 is in communication with a notification processing device 6 to actively (i.e. directly operate) or passively (i.e. operated by a user to whom the information carried by the output data is provided) enable an air quality processing mechanism, e.g., an air cleaner or an air-conditioner is enabled to clean the air.

In an embodiment, the connection device 4 is a display device with a wired communication module (e.g., a desktop computer). In another embodiment, the connection device 4 is a display device with a wireless communication module (e.g., a notebook computer). In another embodiment, the connection device 4 is a portable electronic device with a wireless communication module (e.g., a mobile phone). For example, the wired communication module may have an RS485 communication port, an RS232 communication port, a Modbus communication port or a KNX communication port for performing a wired communication process (for establishing a wired transmission path). The wireless communication module may perform a wireless communication process (for establishing a wireless transmission path) by using a Zigbee communication technology, a Z-wave communication technology, an RF communication technology, a Bluetooth communication technology, a Wifi communication technology or an EnOcean communication technology. The connection device 4 may also send the information carried by the output data to the networking relay station 7, after which the networking relay station 7 sends the information carried by the output data to the cloud data processor 8 to make it stored in and processed by the cloud data processor 8. The cloud data processor 8 processes the information carried by the output data to correspondingly issue a notification signal to the connection device 4 through the networking relay station 7. After the connection device 4 receives the notification signal, the notification processing system 5 connected to the connection device 4 receives the notification signal from the connection device 4, and accordingly enables an air quality notification mechanism. Alternatively, the notification processing device 6 connected to the connection device 4 receives the notification signal from the connection device 4, and accordingly enables an air quality processing mechanism.

In an embodiment, the connection device 4 issues a control command to the actuating and sensing device 1 so as to control the operation of the actuating and sensing device 1. Similarly, the control command is transmitted to the data transceiver 16 in the wired or wireless communication transmission manner as discussed above. Then, the control command is transmitted to the microprocessor 14 to control the sensor 12 to perform the sensing operation and enable the actuating device 13.

In an embodiment, the driving and information transmitting system for the actuating and sensing device 1 further includes a second connection device 9. After the second connection device 9 issues the control command to the cloud data processor 8 through the networking relay station 7, the control command is transmitted from the cloud data processor 8 to the connection device 4 through the networking relay station 7, so that the connection device 4 issues the control command to the data transceiver 16. Then, the control command is transmitted to the microprocessor 14. According to the control command, the microprocessor 14 controls the sensor 12 to perform the sensing operation and enables the actuating device 13. In an embodiment, the second connection device 9 is a device with a wired communication module. In other embodiment, the second connection device 9 is a device with a wireless communication module. In another embodiment, the second connection device 9 is a portable electronic device with a wireless communication module, but not limited thereto.

The actuating and sensing device 1 of the air-filtering protection device can be detached from the filtering mask 2 to form an independent and portable actuating and sensing module for monitoring the air quality. Namely, the air-filtering protection device may have capability for monitoring the air quality outside the filtering mask 2. The actuating and sensing device 1 is mounted and positioned on the filtering mask 2, and the filtering mask 2 is worn by a user to cover the mouth and nose for enclosing air therein. When the actuating device 13 is enabled to transfer the air, the air enclosed by the filtering mask 2 is introduced into the interior of the actuating and sensing device 1 through the fluid communication between the first air channel 212 of the first coupling element 21 and the second air channel 103 of the second coupling element 10. Consequently, the air circulation is enhanced, the polluted air is exhausted, the temperature and the humidity are adjusted and the air exchanging inside the filtering mask 2 is achieved. Since the air enclosed by the filtering mask 2 and introduced into the interior of the actuating and sensing device 1 is monitored by the sensor 12, the air quality monitoring inside the filtering mask is achieved. Furthermore, according to the condition of the air quality inside the filtering mask 2, pumping speed of the actuating device 13 is adjusted and controlled to generate different flow rates of the air (e.g. amount of air exhaustion) so that the air quality inside the filtering mask 2 is adjusted. When the sensor 12 monitors that the air quality is poor and harmful to human beings continuously, a notification signal is issued to notify the user for replacing the filtering mask 2. The actuating and sensing device 1 is able to transmit the output data derived from measurement of the air to the connection device 4 through the data transceiver 16. The output data is displayed, stored and transmitted by the connection device 4. Consequently, the purpose of displaying the information carried by the output data and issuing the notification signal in real time are achieved. Moreover, the information carried by the output data can be transmitted to a cloud database. Consequently, the purpose of constructing and managing the data can be achieved. Accordingly, an air quality notification mechanism and an air quality processing mechanism are enabled. Therefore, the user can wear the air-filtering protection device immediately to prevent from the influence on human health caused by the air pollution.

From the above descriptions, the present disclosure provides a driving and information transmitting system for an air-filtering protection device, which is capable of combining with an actuating and sensing device. The actuating device can promote air circulation and thus provide the sensor with the amount of the air stably and uniformly. Since the sensor is provided with the amount of the air stably and uniformly, the response time of the sensor to the air is largely reduced, thereby monitoring the air with precision. Besides, the actuating and sensing device may not be equipped with a power source itself. Rather, the actuating and sensing device may be coupled to an external power supply device for energy transfer, thereby enabling the sensor and the actuating device for operation. Accordingly, the configuration described above can be applied to the air-filtering protection device and saves a lot of space when installing the entire module, and the purpose of minimizing the design of the module is achieved. The data transceiver of the actuating and sensing device transmits the output data derived from measurement of the air to the connection device. The output data is displayed, stored and transmitted by the connection device. Consequently, the purpose of displaying the information carried by the output data and issuing the notification signal in real time are achieved. Meanwhile, the information carried by the output data can be transmitted to a cloud database, by which the purpose of constructing and managing the data can be achieved, and in response to that, an air quality notification mechanism and an air quality processing mechanism are enabled. Therefore, the user can wear the air-filtering protection device immediately to prevent from the influence on human health caused by the air pollution. In other words, the electronic device of the present disclosure is industrially valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A driving and information transmitting system for an air-filtering protection device, comprising:
    a filtering mask adapted to be worn to filter air and comprises a first coupling element and a filtering element, wherein the first coupling element comprises an air channel, and the air channel runs through an inner surface and an outer surface of the filtering mask, wherein the filtering element is disposed in the air channel;
    an actuating and sensing device comprising a second coupling element configured to engage with the first coupling element of the filtering mask to detachably mount the actuating and sensing device to the filtering mask, wherein the actuating and sensing device is mounted and positioned on the filtering mask through the coupling elements, the actuating and sensing device further comprising at least one sensor, at least one actuating device, a microprocessor, a power controller and a data transceiver, wherein the at least one actuating device is enabled to transfer air to flow toward the at least one sensor so as to make the air sensed by the at least one sensor, wherein the air channel allows the air to be introduced into the actuating and sensing device and monitored;
    a power supply device configured to transfer energy to the power controller, so that the power controller receives the energy and enables the at least one sensor and the at least one actuating device; and
    a connection device,
    wherein after monitored information is generated by the at least one sensor and processed into an output data by the microprocessor, the data transceiver receives and transmits the output data to the connection device, and wherein after a control command is given by the connection device, the data transceiver receives and transmits the control command to the microprocessor to control the at least one sensor to perform a sensing operation and enable the at least one actuating device.

2. The driving and information transmitting system for the air-filtering protection device according to claim 1, wherein the filtering mask is a mouth mask.

3. The driving and information transmitting system for the air-filtering protection device according to claim 1, wherein the filtering mask is a wearable face mask.

4. The driving and information transmitting system for the air-filtering protection device according to claim 1, wherein the at least one actuating device comprises at least one selected from a group consisting of: an electric actuating device, a magnetic actuating device, a thermal actuating device, a piezoelectric actuating device, a fluid actuating device and combinations thereof.

5. The driving and information transmitting system for the air-filtering protection device according to claim 1, wherein the at least one sensor comprises at least one selected from a group consisting of: a gas sensor, an oxygen sensor, a carbon monoxide sensor, a carbon dioxide sensor, a liquid sensor, a temperature sensor, a humidity sensor, an ozone sensor, a particulate sensor, a volatile organic compound sensor, a light sensor, a virus sensor, a bacterial sensor, a microbiological sensor and combinations thereof.

6. The driving and information transmitting system for the air-filtering protection device according to claim 4, wherein the fluid actuating device is a micro-electro-mechanical system (MEMS) pump.

7. The driving and information transmitting system for the air-filtering protection device according to claim 4, wherein the fluid actuating device is a piezoelectric pump, the piezoelectric pump comprising:
    a gas inlet plate having at least one inlet, at least one convergence channel and a central cavity defining a convergence chamber, wherein the at least one inlet allows the air to flow in, and the at least one convergence channel is disposed corresponding to the at least one inlet and guides the air from the at least one inlet toward the convergence chamber defined by the central cavity;
    a resonance plate having a central aperture and a movable part, wherein the central aperture is aligned with the convergence chamber and the movable part surrounds the central aperture; and
    a piezoelectric actuator aligned with the resonance plate, wherein a gap is formed between the resonance plate and the piezoelectric actuator to define a first chamber, so that the air from the at least one inlet of the gas inlet plate is converged to the central cavity along the at least one convergence channel and flows into the first chamber through the central aperture of the resonance plate when the piezoelectric actuator is enabled, whereby the air is further transferred through a resonance effect between the piezoelectric actuator and the movable part of the resonance plate.

8. The driving and information transmitting system for the air-filtering protection device according to claim 7, wherein the piezoelectric actuator comprises:
    a suspension plate being a square suspension plate and having a first surface, an opposing second surface and a bulge, wherein the suspension plate is permitted to undergo a bending vibration;
    an outer frame arranged around the suspension plate;
    at least one bracket connected between the suspension plate and the outer frame for elastically supporting the suspension plate; and
    a piezoelectric plate, wherein a length of a side of the piezoelectric plate is smaller than or equal to a length of a side of the suspension plate, and the piezoelectric plate is attached on the first surface of the suspension plate, wherein when a voltage is applied to the piezoelectric plate, the suspension plate is driven to undergo the bending vibration,
    wherein the fluid actuating device further comprises a conducting plate, a first insulation plate and a second insulation plate, wherein the gas inlet plate, the resonance plate, the piezoelectric actuator, the first insulation plate, the conducting plate and the second insulation plate are sequentially stacked.

9. The driving and information transmitting system for the air-filtering protection device according to claim 1, wherein the power supply device transfers the energy through a wired transmission path or a wireless transmission path.

10. The driving and information transmitting system for the air-filtering protection device according to claim 1, wherein the power controller of the actuating and sensing device comprises a charging element for storing and outputting the energy, thereby providing the energy to the at least one sensor and the at least one actuating device to perform sensing operation and actuating operation respectively.

11. The driving and information transmitting system for the air-filtering protection device according to claim 1, wherein the connection device is configured to display, store and transmit information carried by the output data.

12. The driving and information transmitting system for the air-filtering protection device according to claim 11, wherein the connection device is connected to a notification processing system to enable an air quality notification mechanism.

13. The driving and information transmitting system for the air-filtering protection device according to claim 11, wherein the connection device is connected to a notification processing device to enable an air quality processing mechanism.

14. The driving and information transmitting system for the air-filtering protection device according to claim 11, wherein the connection device is at least one selected from a group consisting of: a display device having a wired communication module, a display device having a wireless communication module and a portable electronic device having a wireless communication module.

15. The driving and information transmitting system for the air-filtering protection device according to claim 1, further comprising a networking relay station and a cloud data processor, wherein the connection device transmits information carried by the output data to the networking relay station, the networking relay station transmitting the information carried by the output data to the cloud data processor to be processed and stored.

16. The driving and information transmitting system for the air-filtering protection device according to claim 15, wherein after the information carried by the output data is processed by the cloud data processor, the cloud data processor issues a notification signal to the networking relay station and then transmits the notification signal to the connection device, wherein the connection device is connected to a notification processing system to enable an air quality notification mechanism.

17. The driving and information transmitting system for the air-filtering protection device according to claim 15, wherein after the information carried by the output data is processed by the cloud data processor, the cloud data processor issues a notification signal to the networking relay station and then transmits the notification signal to the connection device, wherein the connection device is connected to a notification processing device to enable an air quality processing mechanism.

18. The driving and information transmitting system for the air-filtering protection device according to claim 16, wherein the connection device is at least one selected from a group consisting of: a display device having a wired communication module, a display device having a wireless communication module and a portable electronic device having a wireless communication module.

19. The driving and information transmitting system for the air-filtering protection device according to claim 15, further comprising a second connection device configured to issue the control command, wherein after the second connection device issues the control command to the cloud data processor through the networking relay station, the control command is transmitted from the cloud data processor to the connection device through the networking relay station, so that the connection device issues the control command to the data transceiver.

20. A driving and information transmitting system for an air-filtering protection device, comprising:
at least one filtering mask adapted to be worn to filter air and comprises a first coupling element and filtering element, wherein the first coupling element comprises an air channel, and the air channel runs through an inner surface and an outer surface of the at least one filtering mask, wherein the filtering element is disposed in the air channel;
at least one actuating and sensing device comprising a second coupling element configured to engage with the first coupling element of the at least one filtering mask to detachably mount the at least one actuating and sensing device to the at least one filtering mask, wherein the at least one actuating and sensing device is mounted and positioned on the at least one filtering mask through the coupling elements, the at least one actuating and sensing device further comprising at least one sensor, at least one actuating device, at least one microprocessor, at least one power controller and at least one data transceiver, wherein the at least one actuating device is enabled to transfer at least one air to flow toward the at least one sensor so as to make the air sensed by the at least one sensor, wherein the air channel allows the air to be introduced into the at least one actuating and sensing device and monitored;
at least one power supply device configured to transfer at least one energy to the at least one power controller, so that the at least one power controller receives the energy and enables the at least one sensor and the at least one actuating device; and
at least one connection device,
wherein after monitored information is generated by the at least one sensor and processed into at least one output data by the at least one microprocessor, the at least one data transceiver receives and transmits the at least one output data to the at least one connection device, and wherein after at least one control command is given by the at least one connection device, the at least one data transceiver receives and transmits the at least one control command to the at least one microprocessor to control the at least one sensor to perform a sensing operation and enable the at least one actuating device.

21. The driving and information transmitting system for the air-filtering protection device according to claim 17, wherein the connection device is at least one selected from a group consisting of: a display device having a wired communication module, a display device having a wireless communication module and a portable electronic device having a wireless communication module.

* * * * *